United States Patent Office 3,553,318
Patented Jan. 5, 1971

1

3,553,318
SPERMICIDAL ORGANOSILICON LUBRICANT COMPOSITION
Robert Craig Anderson, Seamill, Ernest Bingham Burns, Irvine, and Graham Westwood Cross, Saltcoats, Scotland, assignors to Imperial Chemical Industries Limited, London, England, a corporation of Great Britain
No Drawing. Filed Mar. 22, 1965, Ser. No. 441,872
Claims priority, application Great Britain, Apr. 6, 1964, 14,028
Int. Cl. A61k 27/00
U.S. Cl. 424—184        12 Claims

ABSTRACT OF THE DISCLOSURE

There is provided a spermicidal organosilicon lubricant composition useful as a lubricant for condoms which comprises a spermicidal compound of the formula

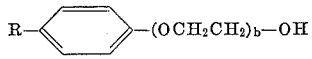

in which R is an alkyl group having from 6 to 20 carbon atoms and $b$ is an integer having a value of from 6 to 20 inclusive, dissolved in a water insoluble polysiloxanepolyoxyalkylene copolymer of the formula

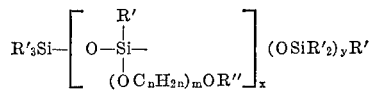

wherein R' is selected from the group consisting of methyl, ethyl, propyl, butyl, octyl, cyclohexyl, phenyl, tolyl, benzyl, and phenylethyl groups, R" is selected from the group consisting of methyl, ethyl, propyl, n-butyl, octyl, cyclohexyl, phenyl and nonylphenyl groups and siloxanyl, $n$ is 2, 3 or 4, $m$ is an integer having a value of from 1 to 100, $x$ is an integer having a value of from 1 to 199, $y$ is an integer having a value of from 1 to 199 and $x+y$ is an integer from 2 to 200 inclusive. The proportion of spermicidal compound dissolved in the polysiloxanepolyoxyalkylene copolymer is from 0.1 to 50 parts per 100 parts by weight of the composition.

---

This invention relates to new and useful compositions based on organosilicon compounds and which are biologically active.

Organosilicon compounds and compositions are well-known and are readily available and because of their many advantageous properties are used in a wide variety of applications which include, for example, use as lubricants. For some purposes it is, however, desirable that the organosilicon compositions should also have other special properties. Thus it is for some purposes desirable that an organosilicon composition should have spermicidal properties, for example, for use as a lubricant for condoms.

According to the present invention a spermicidal organosilicon lubricant composition comprises a spermicidal compound dissolved in a water insoluble polysiloxanepolyoxyalkylene copolymer.

A wide variety of spermicidal compounds may be used in the compositions of our invention. The preferred spermicidal compounds are, however, polyethyleneoxyalkylphenols having the general formula

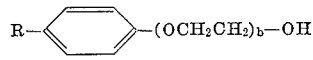

where R is an alkyl group having an alkyl group having from 6 to 20 carbon atoms and $b$ is an integer having a value of from 6 to 20 inclusive. The compound in which $b$ has the value of 9 is particularly preferred.

2

The alkyl group R may be, for example, a hexyl, heptyl, octyl or nonyl group. It is, however, in general preferred that R be an octyl or a nonyl group, for example, such as a 3,5,5-trimethylhexyl group.

The proportion of the spermicidal compound dissolved in the polysiloxane-polyoxyalkylene copolymer may vary widely, for example, from 0.1 to 50 parts by weight per 100 parts by weight of composition. It is, however, in general preferred that the proportion should be of the order of 1 to 15 parts of spermicidal compound per 100 parts of composition.

A wide variety of water insoluble polysiloxanepolyoxyalkylene copolymers may be used in the compositions of our invention. Included among suitable types of copolymer are those described in, for example, British patent specifications Nos. 802,467, 802,688, 804,369, 880,024, 892,136, 892,819, 916,561, 926,914, 954,041, and 963,437. These may be, for example, linear (block) copolymers of polymeric alkylene oxides and polymeric dialkylsiloxanes, branched (graft) copolymers of polymeric alkylene oxides and polymeric dialkylsiloxanes or copolymers which are part block and part graft.

The siloxane portion of the copolymer may be linear or branched and at least a major proportion of the groups directly attached to silicon atoms should be hydrocarbyl groups such as, for example, methyl, ethyl, propyl, butyl, octyl, cyclohexyl, phenyl, tolyl, benzyl or phenylethyl groups, and in many cases it is preferred that they be methyl or phenyl groups. There may, of course, also be present in small amounts other substituents such as, for example, hydrogen, hydroxyl groups, —CH$_2$CH$_2$COOH groups, CH$_3$CH—COOH groups

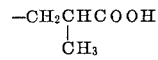

groups and (CH$_2$)$_n$OH groups where $n$ is an integer from 3 to 6 inclusive.

The oxyalkylene portion of the copolymer may vary in size, for example, from 1 up to 100 or more oxyalkylene units. It is, however, normally preferred that it should have from 4 to 40 oxyalkylene units. It may, of course, be linked to a siloxane portion at only one or at both ends. Where it is linked only at one end the other end may be linked through an oxygen atom to a hydrocarbyl or substituted hydrocarbyl group or to a hydrogen atom. The oxyalkylene portion and the siloxane portion may be connected by any one of a variety of linkages. Thus a carbon atom of an oxyalkylene group may be connected, for example, to a silicon atom of a siloxane group directly through an oxygen atom to give the linkage C—O—Si or through a further silicon atom to give the linkage C—O— SI(CH$_2$)$_p$Si where $p$ is an integer from 1 to 4 inclusive, for example —CH$_2$—CH$_2$—, or through a divalent hydrocarbyl group A, for example (CH$_2$)$_3$, to give the linkage C—O—A—Si. Alternatively a carbon atom of an oxyalkylene group may be connected to a silicon atom of a siloxane through a carboxyalkyl group for example, as in the group

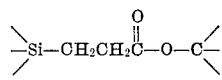

Preferred copolymers are those that are water insoluble and of the general formula:

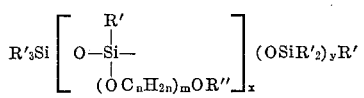

where R' represents a monovalent hydrocarbyl group, R" represents an alkyl, aryl, alkaryl or cycloalkyl group, $n$ is 2, 3 or 4, $m$ is an integer having a value of from 1 to 100, $x$ is an integer having a value of from 1 to 199, $y$ is an integer having a value of from 199 to 1 and $x+y$ is an integer from 2 to 200 inclusive. In another preferred type of copolymer, the group R″ is replaced by a siloxanyl chain, the other end of which may or may not be attached to another oxyalkylene block.

The monovalent hydrocarbyl groups R′, which may or may not be all alike, may be aliphatic groups such as, for example, methyl, ethyl, propyl, butyl, or octyl groups, cycloaliphatic groups such as cyclohexyl groups, aryl, alkaryl or aralkyl groups such as phenyl, tolyl, benzyl or phenylethyl groups. The group R″ may be, for example, a methyl, ethyl, propyl, butyl, octyl, cyclohexyl, phenyl or nonylphenyl group. It is, however, preferred that the groups R′ be methyl groups and that the groups R″ be n-butyl or octyl groups.

In the oxyalkylene portion of the molecule the integer $n$ may be 2, 3 or 4. It is, however, normally preferred that it should be 3. It should, of course, be noted that not all copolymers in which $n$ is 2 are water insoluble. Only those which are insoluble are suitable for use in the compositions of our invention. It is also possible to have copolymers in which not all of the oxyalkylene groups are alike, i.e., $n$ can have differing values in the same copolymer. The integer $m$ may, as stated, vary from 1 to 100. It is, however, in general preferred that it should have a value from 4 to 40.

It is also preferred that the ratio of oxyalkylene units to silicon atoms should not be less than 1:1 and it is further preferred that it should be from 1.5:1 to 10:1 inclusive.

While the value of the integer $x$ may vary from 1 to 199, it is normally preferred that it should be from 3 to 50 inclusive. In the case of the integer $y$ which, as stated above, may vary from 199 to 1, it is normally preferred that it should be from 1 to 50. It is also preferred that the ratio of $y$ to $x$ should be from 1:50 to 9:1. It should, of course, be understood that it is quite unnecessary for all of the silicon atoms carrying polyoxyalkylene groups to be together and that these may be randomly distributed throughout the chain or may be at the end of the chain.

The spermicidal lubricant compositions of our invention are suitable for various applications. One important use is as a lubricant applied to condoms during manufacture and for this purpose it is normally required that the viscosity be from 100 to 1200 cs. at 25° C. to enable the lubricant to spread on the rolled article. It is, in fact, normally preferred that the viscosity be from 200 to 500 cs. at 25° C. if the composition is to be used for this purpose.

Our invention is further illustrated by the following examples in which all parts and percentages are by weight.

EXAMPLE 1

10 parts of a polyethyleneoxynonylphenol of the formula given above in which R is a 3,5,5-trimethylhexyl group and $a$ is 9 were dissolved in 90 parts of a copolymer made by reacting 240 parts of a polypropyleneoxide of equivalent weight 2,400 ($m=42$) terminated at one end by an n-butoxy and at the other by a hydroxyl group with 50 parts of a linear dimethylpolysiloxane in which 3 randomly distributed non-terminal silicon atoms each had one methyl group and one hydrogen atom attached thereto and which had 20 silicon atoms in the molecule. The viscosity of this product was 2400 cs. at 25° C.

The spermicidal activity of this composition was tested by adding the composition to fresh semen. All sperm present were killed within 17 seconds of addition.

EXAMPLE 2

The procedure of Example 1 was followed except that the polypropyleneoxide used was of equivalent weight 1,620 ($m=28$). The viscosity of the product was 1150 cs. at 24° C. Similar results were obtained with this composition.

EXAMPLE 3

5 parts of the polyethyleneoxynonylphenol used in Example 1 were dissolved in 95 parts of the copolymer used in Example 2, giving a product of viscosity 1170 cs. at 25° C. When tested in a manner similar to that of Example 1 all sperm were killed within 25 seconds.

For purposes of comparison a similar composition was made up using 10 parts of the same polyethyleneoxynonylphenol and 90 parts of a water-soluble organopolysiloxane of the general formula

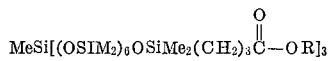

made by reacting a carboxyalkylpolysiloxane with a polyether HOR which is a random copolymer of 17 oxyethylene units and 13 oxypropylene units (i.e., of equal weights of ethylene oxide and propylene oxide) of average molecular weight 1500.

When tested in a manner similar to that of Example 1 the time taken to kill all sperm was more than 300 seconds.

It will thus be seen that the spermicidal properties of the spermicide are decreased when dissolved in siloxane polymers of a kind other than those specified for the compositions of our invention.

EXAMPLE 4

5 parts of a polyethyleneoxynonylphenol of the formula given above in which R is a 3,5,5-trimethylphenyl group and $a$ is 9, were dissolved in 95 parts of a copolymer made by reacting 60 parts of a polypropylene oxide of equivalent weight 363 ($m=4$) terminated at one end by an octoxy group and at the other by an hydroxyl group with 9.9 parts of a linear trimethyl silyl-ended polysiloxane having 50 silicon atoms each having one methyl group and one hydrogen atom attached thereto and having 52 silicon atoms in the molecule. The viscosity of the product was 110 cs. at 25° C.

The spermicidal activity was tested by adding the composition to fresh semen. All sperm present were killed within 5 seconds of addition.

EXAMPLE 5

The procedure of Example 4 was followed except that the siloxane used had 100 silicon atoms each having one methyl group and one hydrogen atom attached hereto and had 102 silicon atoms in the molecule, giving a product of viscosity 135 cs. at 25° C. Similar results were obtained with this composition.

EXAMPLE 6

10 parts of a polyethyleneoxynonylphenol of the formula given above in which R is a 3,5,5-trimethylphenyl group and $a$ is 9 were dissolved in 90 parts of a copolymer made by reacting a mixture of 100 parts of a polypropylene oxide of equivalent weight 363 ($m=4$) terminated at one end by an octoxy group and at the other by a hydroxyl group and 0.46 part of propylene glycol with 18.4 parts of a linear trimethylsilyl-ended polysiloxane having 50 non-terminal silicon atoms, having one methyl group and one hydrogen atom attached thereto and having 52 silicon atoms in the molecule. The product obtained had a viscosity of 1130 cs. at 25° C.

The spermicidal activity was tested by adding the composition to fresh semen. All sperm present were killed within 5 seconds of addition.

What we claim is:
1. A spermicidal organosilicon lubricant composition comprising a spermicidal compound of the formula

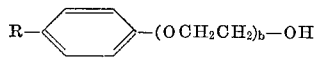

in which R is an alkyl group having from 6 to 20 carbon atoms and $b$ is an integer having a value of from 6 to 20 inclusive, dissolved in a water insoluble polysiloxane-polyoxyalkylene copolymer of the formula

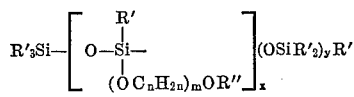

wherein R′ is selected from the group consisting of methyl ethyl, propyl, butyl, octyl, cyclohexyl, phenyl, tolyl, benzyl, and phenylethyl groups, R″ is selected from the group consisting of methyl, ethyl, propyl, n-butyl, octyl, cyclohexyl, phenyl, nonylphenyl and siloxanyl, $n$ is 2, 3 or 4, $m$ is an integer having a value of from 1 to 100, $x$ is an integer having a value of from 1 to 199, $y$ is an integer having a value of from 1 to 199 and $x+y$ is an integer from 2 to 200 inclusive, the proportion of spermicidal compound dissolved in the polysiloxane-polyoxyalkylene copolymer being from 0.1 to 50 parts per 100 parts by weight of the composition.

2. A composition according to claim 1 wherein the group R is selected from the group consisting of hexyl, heptyl, octyl, 3,5,5-trimethylhexyl and nonyl groups.

3. A composition according to claim 1 wherein a carbon atom of an oxyalkylene portion of the said copolymer is connected to a silicon atom of a siloxane portion through a further silicon atom to give the linkage

where $p$ is an integer from 1 to 4 inclusive.

4. A composition according to claim 3 wherein $p$ is 2.

5. A composition according to Claim 1 wherein $b$ is 9.

6. A composition according to claim 1 wherein the proportion of spermicidal compound is from 1 to 15 parts per 100 parts by weight of the composition.

7. A composition according to claim 1 wherein the integer $m$ is from 4 to 40.

8. A composition according to claim 1 wherein the ratio of oxyalkylene units to silicon atoms is not less than 1 to 1.

9. A composition according to claim 8, wherein the ratio of oxyalkylene units to silicon atoms is from 1.5:1 to 10:1.

10. A composition according to claim 1 wherein $x$ is from 3 to 50.

11. A composition according to claim 10 wherein the ratio of $y$ to $x$ is from 1 to 50 to 9:1.

12. A composition according to claim 1 wherein $y$ is from 1 to 50.

References Cited

UNITED STATES PATENTS

| 2,460,795 | 2/1949 | Warrick | 260—46.5X |
| 2,541,103 | 2/1951 | Sander | 167—58 |
| 2,541,851 | 2/1951 | Wright | 260—46.5X |
| 2,770,631 | 11/1956 | Merker | 167—90X |
| 2,923,095 | 2/1960 | Pelonnier et al. | 167—65X |
| 2,943,979 | 7/1960 | Elias | 167—58 |
| 3,244,589 | 4/1966 | Sunnen et al. | 167—58 |
| 2,391,094 | 12/1945 | Karg | 424—340X |
| 2,572,876 | 10/1951 | Rust et al. | 260—46.5 |
| 3,279,996 | 10/1966 | Long, Jr. et al. | 424—184 |

FOREIGN PATENTS

| 110,600 | 5/1940 | Australia | 167—58 |
| 916,561 | 11/1963 | Great Britain | 424—184 |
| 926,914 | 5/1963 | Great Britain | 424—184 |
| 954,041 | 4/1964 | Great Britain | 424—184 |
| 963,437 | 7/1964 | Great Britain | 424—184 |
| 802,467 | 10/1958 | Great Britain | 424—184 |
| 802,688 | 10/1958 | Great Britain | 424—184 |
| 804,369 | 11/1958 | Great Britain | 424—184 |
| 880,024 | 10/1961 | Great Britain | 424—184 |
| 892,136 | 3/1962 | Great Britain | 424—184 |
| 892,819 | 3/1962 | Great Britain | 424—184 |

OTHER REFERENCES

Military Surgeon, 1950, vol. 106, pp. 379–387 (p. 384 relied upon).

Himes, Medical History of Contraception, 1963, pp. 201–203, RG 136 H5.

American Professional Pharmacist, February 1955, vol. 21, No. 2, pp. 129–133, 172 and 173.

ALBERT T. MEYERS, Primary Examiner

D. R. ORE, Assistant Examiner

U.S. Cl. X.R.

424—340

UNITED STATES PATENT OFFICE
CERTIFICATE OF CORRECTION

Patent No. 3,553,318      Dated January 5, 1971

Inventor(s) Robert Craig Anderson, Ernest Bingham Burns and Graham Westwood Cross It is certified that error appears in the above-identified patent and that said Letters Patent are hereby corrected as shown below:

Column 1, in the heading, after "14,028" insert --application Great Britain, Apr. 24, 1964, 17,099 and application Great Britain, August 13, 1964, 33,039--

Signed and sealed this 13th day of July 1971.

(SEAL)
Attest:

EDWARD M. FLETCHER, JR.
Attesting Officer

WILLIAM E. SCHUYLER, JR.
Commissioner of Patents